Sept. 15, 1970

J. R. MELCHER 3,528,287

ELECTROHYDRODYNAMIC INDUCTION FLOWMETER
AND CONDUCTIVITY MEASURING DEVICE

Filed Dec. 6, 1967

INVENTOR
JAMES R. MELCHER
BY Robert F. Shaw
ATTORNEY

INVENTOR
JAMES R. MELCHER
BY *Robert Shaw*
ATTORNEY

United States Patent Office 3,528,287
Patented Sept. 15, 1970

3,528,287
ELECTROHYDRODYNAMIC INDUCTION FLOW-METER AND CONDUCTIVITY MEASURING DEVICE
James R. Melcher, Lexington, Mass., assignor to Massachusetts Institute of Technology, Cambridge, Mass., a corporation of Massachusetts
Filed Dec. 6, 1967, Ser. No. 688,552
Int. Cl. G01p 5/08
U.S. Cl. 73—194                                23 Claims

ABSTRACT OF THE DISCLOSURE

Apparatus for determining the velocity and electrical conductivity of a moving material of high electrical resistance by subjecting the material to a transverse electro-quasistatic field and sensing position changes of charge accumulations induced within the material by the field, by virtue of relative movement between the material and the position sensing means. In a broad sense, the apparatus is useful to detect relative movement between the material and the sensing means irrespective of which, in fact, is moving.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

In an application for Letters Patent, Ser. No. 647,526, filed on June 20, 1967 by the present inventor (now Pat. 3,463,944, dated Aug. 26, 1969), there is described apparatus employing an electro-quasistatic traveling-wave field to perform a pump function or a generator function. The apparatus herein described, as discussed in an article by the present inventor entitled "Charge Relaxation on a Moving Liquid Interface," The Physics of Fluids, vol. 10, No. 2, February 1967, pp. 325–332, also employs an electro-quasistatic field, but here the wave is a standing wave which serves to induce charge accumulations in a material and relative movement between the material and electrodes disposed along the path of travel of the material is sensed by the effect of position changes of the charge accumulations, thereby to provide an indication of the magnitude of such relative movement and the electrical conductivity of the moving material. The term "electro-quasistatic" as used herein denotes an electric potential wave that performs the desired function by virtue of the electrostatic properties of the electric field although the field may be changing in time as it is in the present disclosure. In the embodiment herein disclosed the field is introduced and relative movement is sensed by electrodes mechanically isolated from the material, i.e., not in mechanical contact with material, but electrically coupled to the material through the electric field influence.

Mechanical and electromechanical devices are available to enable measurement of velocities of various fluids and other materials. Among such devices is included apparatus wherein a magnetic field is created in a high-conductivity fluid, and changes wrought upon the field by virtue of movement of the fluid are sensed. Such apparatus may be made to perform its function without mechanical contact being effected with the fluid, and is useful particularly in connection with high-conductivity fluids, although apparatus has been proposed which, with proper electrical screening, is said to function even in connection with relatively low-conductivity fluids.

The present invention is concerned with and it is an object to provide a flowmeter which will measure velocities of material of substantially low conductivity without the necessity for mechanical contact between the electrical working elements of the meter and the material.

A further object is to provide a flowmeter which is insensitive to changes in conductivity of the material within the range of conductivities for which it is adapted to operate.

Although the meter is described in connection with its principal function, to measure the velocity of a moving material, the meter being stationary in space, it will function as well if the material is stationary and the meter is moving; accordingly, a still further object is to provide a meter to measure relative movement between the meter and the material irrespective of which is moving in free space.

Another object is to provide a flowmeter wherein an electro-quasistatic field is imposed upon a material of high electrical resistance in a lateral or transverse direction and any relative movement between the source of the field and the material in the longitudinal direction is detected and interpreted to provide a reading of the magnitude of such movement.

Still another object is to provide apparatus adapted to indicate conductivity of the material, as well. Other and still further objects will be evident in the specification to follow and will be particularly pointed out in the appended claims.

By way of summary, the objects of the invention are attained in a flowmeter apparatus wherein a fluid or other material moving in a direction is subjected to an electro-quasistatic field having an effective component orthogonal to the direction of movement to induce charge accumulations within the material. Electrode sensing means disposed along the path of travel of the fluid, but mechanically isolated therefrom, detect or sense changes in the position of the charge accumulations in said direction by virtue of the relative movement between the fluid and the source of the electro-quasistatic field.

The invention will now be described with reference to the accompanying drawings wherein.

Figure 1:
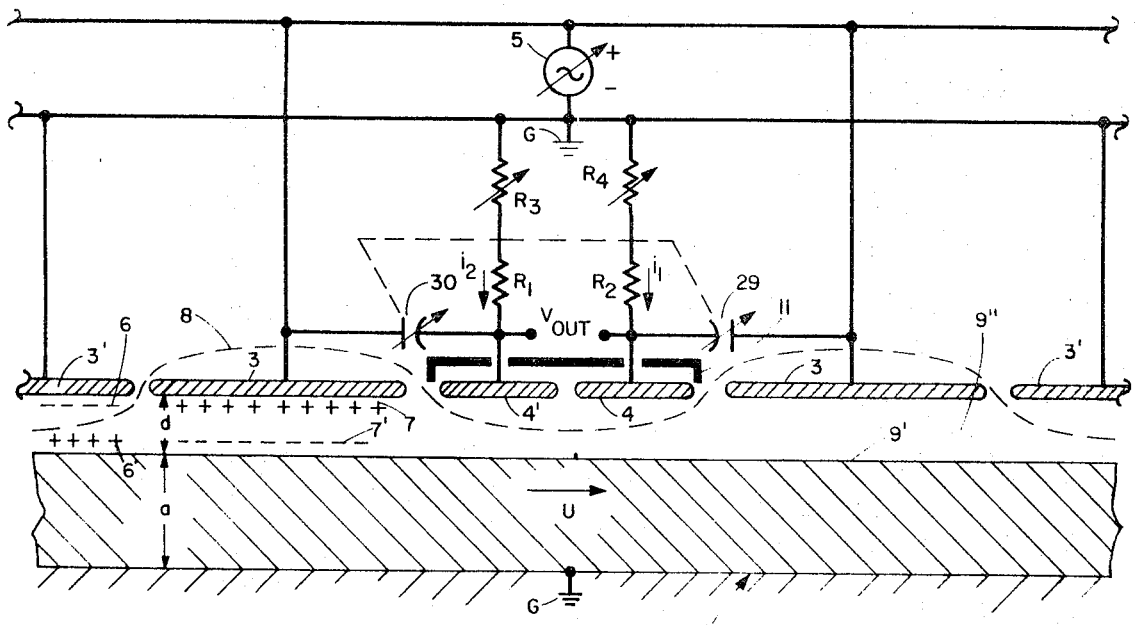
FIG. 1 is a schematic representation of apparatus adapted to practice the present invention and shows a plurality of electrodes disposed above a moving material with a pair of central electrodes to sense movement of the material.
Figure 2:
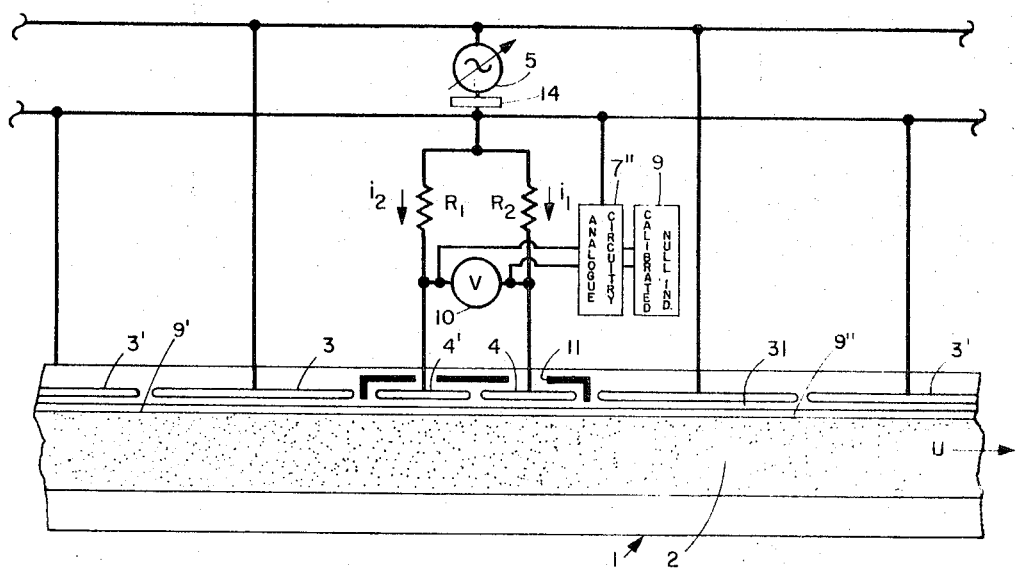
FIG. 2 is a schematic diagram of apparatus similar to that shown in FIG. 1.

Turning now to the drawings, apparatus for determining the velocity and/or electrical conductivity of a moving material 2 of high electrical resistance, is shown schematically at 1 in FIGS. 1 and 2 comprising a plurality of electrodes 3, 3' (mechanically isolated from said material, as by an air gap 9") for introducing to the material 2 an electro-quasistatic field having an effective component orthogonal to the direction of movement of the material. As is explained in said application, an electric potential imposed upon the electrodes induces an electric charge upon the electrode surfaces, which, in turn, induces charges of opposite polarity in the material adjacent thereto to a degree determined directly by the strength of the electric potential and at a rate inversely proportional to the electric relaxation time constant of the material. The direction of movement of the material 2 in FIGS. 1 and 2 is that designated by the arrow U. The electrodes 3, 3' are connected across a variable-frequency source 5 of A-C electric potential, as shown, so that at any particular time adjacent electrodes contain charges of opposite polarity. For example, at the time depicted in FIG. 1, the electrodes 3' contain negative charges 6 and the electrodes 3 contain positive charges 7, the resulting induced charges in the fluid 2 being shown respectively at 6' and 7'. With the fluid stationary, the surface charges 6 and 7 induced on the electrode surfaces and the respective induced charges 6' and 7' at the interface 9' of the fluid are in spatial phase with the imposed potential represented by the curve shown at 8. However, if the fluid 2 is moving, the charges 6' and 7' are shifted in spatial phase. This is true because the charges require a finite time (on the order of the relaxation time $\epsilon/\sigma$) to accumulate at the interface or disperse therefrom. With the interface close to the electrodes, the charges there form a significant part of the images for charges on the electrodes. Hence, the fluid motion also creates a shift in the spatial phase of the electrode charge distribution, thus serving a very useful purpose in the present device.

As shown in FIG. 1, each of the electrodes 3, 3' form one-half wavelength for electric potential distribution along the direction of fluid flow. A pair of sensor electrodes 4, 4' together form one-half wavelength, the imposed potential on the pair, as explained more fully hereinafter, being substantially the same as the potential on the electrodes 3' at any particular instant of time. However, whereas on any particular electrode 3' the charge distribution serves no particular purpose, in the electrode pair 4–4' a potential difference $V_{out}$ occurs between the pair across resistors $R_1$, $R_2$, $R_3$ and $R_4$ connected serially across the electrode pair. Resistor pairs $R_2$–$R_4$ and $R_1$–$R_3$ are also connected between the potential source 5 and the respective electrodes 4 and 4', as shown in FIG. 1. Because the potential drop across the resistances $R_1$–$R_3$ and $R_2$–$R_4$ is very small, the sensor electrodes 4—4' can be considered to be at the same potential as the output of the source 5, which is shown at ground G potential in FIG. 1, as far as the imposed potential is concerned. The currents shown at $i_1$ and $i_2$ account for the time rate of change of the charge accumulation on the center electrodes 4, 4'. Then, the voltage $V_{out}$ is proportional to any difference between these currents. In the absence of fluid motion, $V_{out}$ is zero because then the charge distribution is in spatial phase with the potential distribution and $i_1 = i_2$. However, with movement of the fluid, as in the direction of the arrow U, there is an imbalance of the charges on the pair of sensor electrodes 4, 4' and $V_{out}$ is proportional to the magnitude of the imbalance. It is possible under certain conditions, therefore, as will be explained more fully hereinafter, to measure the velocity of the fluid 2 by properly calibrating the voltmeter shown at 10 in FIG. 2 in terms of appropriate linear dimensions of fluid movement per unit of time, irrespective of the frequency of the potential from the source 5, within predetermined limits.

The source of A-C electric potential 5 is connected as shown to introduce different values of electric potential to the adjacent electrodes. Thus, electrodes 3 at the particular instant depicted in FIG. 1 are at a positive potential; whereas the adjacent electrodes 3' (and 4, 4') disposed between each pair of electrodes 3, are at a negative potential, thereby creating regions alternately of positive and negative electric potential along the U direction. The output of the potential source 5 varies in time so that the regions adjacent to electrodes 3, 3', 4–4' vary from positive potential values to negative potential values thereby creating the standing potential wave, represented by the dotted sinusoid 8 in FIG. 1, along the U direction. The electric field has effective transverse and longitudinal components, as discussed in said application. The magnitude of the electric potential imposed by the source 5 should be below a magnitude which would alter the fluid flow significantly.

It was pointed out earlier herein that the difference in magnitude of the absolute values of $i_1$ and $i_2$ is a measure of the velocity of the fluid 2. And, indeed, the difference value is linear with U when the angular frequency $\omega$ of the applied potential wave is much greater than the product of the wave number of the induced wave in the fluid 2 and the fluid velocity, but as $\omega$ approaches either zero or infinity, the current difference approaches zero. The voltmeter 10 connected to measure the value $V_{out}$ at appropriate values of $\omega$ will, therefore, be a measure of the velocity of the fluid 2 and such a meter can be calibrated to give velocity readings, as mentioned. In this mode of operation, the meter will, of course, require calibration where the velocities of fluids of different conductivities are to be measured.

Figure 4:
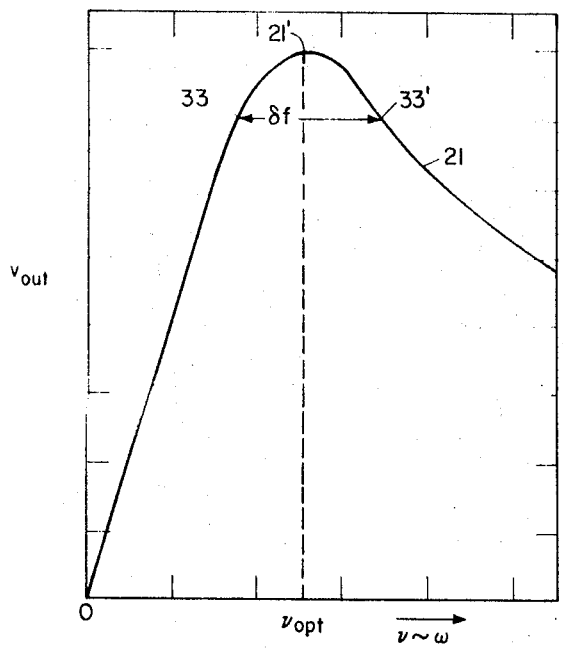
FIG. 4 is a graph showing the value of a voltage appearing across the sensing electrodes as a function of the frequency of an imposed potential.

In the explanation just made, the angular frequency $\omega$ was assumed to be constant at some predetermined value, but if the frequency of the output potential from the power source 5 is varied, some value of $\omega$ will be found, as shown in FIG. 4, at which the reading on the voltmeter 10 will maximize. The particular value of $\omega$ is the value at which there is a maximum energy transfer between the electro-quasistatic field and the material and it can be shown to be substantially equal to the inverse of the time required for the material 2 to traverse one wavelength of the standing wave 8. Thus, a frequency meter in the power source 5 can be calibrated in appropriate linear values, determined by electrode spacing, etc., to give a direct reading of fluid velocity. And the reading thereby obtained is independent of the conductivity of the fluid 2 as shown by the following explanation. The voltage $V_{out}$ is proportional, as before discussed, to $|i_1 - i_2|$. The mathematics, discussed more fully in said article, shows that $V_{out}$ is maximum at a value of $\omega$ at which the following condition exists:

$$\nu_{opt} = (R_e^2 + G^2/F^2)^{1/2}$$

$\nu = \omega \epsilon_0 / \sigma$
$R_e = \epsilon_0 k U / \sigma$
$k$ is wave number of the induced wave in the fluid
$\epsilon_0$ is permittivity in vacuum
U is the fluid velocity
$\sigma$ is electrical conductivity
and
$G/F$ is a geometric constant determined by the relationship $$G/F = 1/\tanh ka \coth kd + (\epsilon/\epsilon_0)$$

where $\epsilon$ is the permittivity of the fluid 2 and the values $d$ and $a$ are respectively the distance between the bottom of the electrodes 3, 3' and 4–4' and the air-fluid interface 9' and the depth of the fluid 2. The geometric constant $G/F$ is determined by the characteristics of the apparatus, the above formula for $G/F$ being for a meter having a conductive bottom 32; the method of arriving at a value of $G/F$ for a meter having a non-conductive bottom is disclosed in said article.

Figure 3:
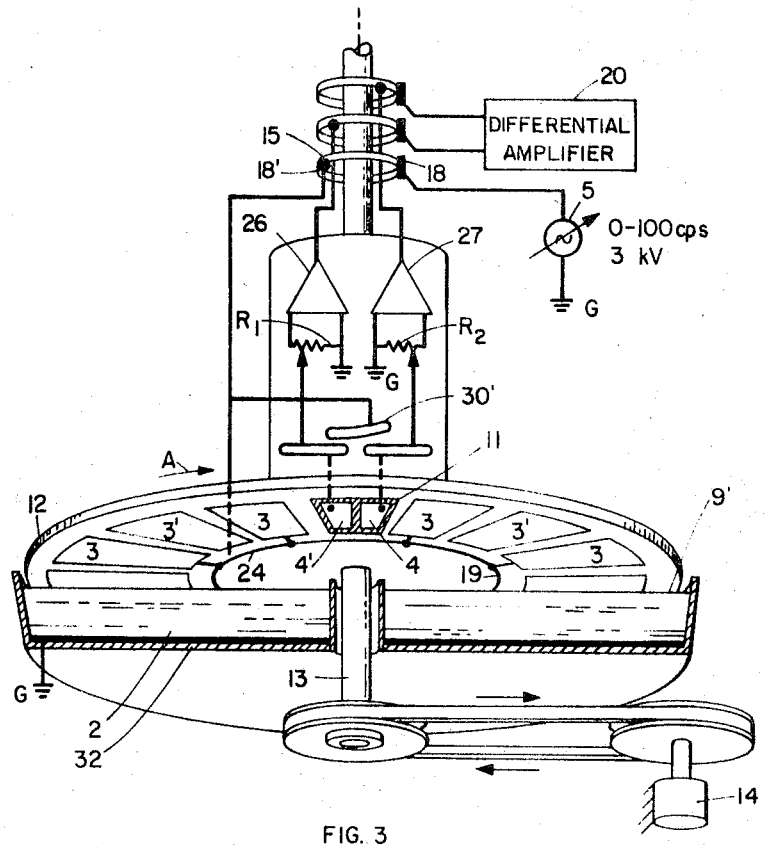
FIG. 3 is schematic representation of a modification of the apparatus of FIG. 1.

The foregoing explanation was made in connection with apparatus in which the source of the quasi-electrostatic field remained fixed while the material 2 moved relative thereto, the number of electrodes 3, 3' required for any particular device being dependent upon the relaxation time of the material of interest. In the embodiment of FIG. 3, however, the fluid 2 remains fixed and the electrodes 3, 3' and 4–4' move relative thereto, said electrodes being secured to a disk 12 which in turn is secured to a shaft 13 driven by an electric motor 14. The arrangement in FIG. 3 presents, in effect, an infinite number of electrodes to the fluid, the transverse component of the electro-quasistatic field from the electrodes passing at right angles to the interface 9'. Potential from the source 5, shown to be at 3 kilovolts and variable in frequency from 0 to 100 cycles per second, passes through a brush 18 to a slip ring 15, thence through a lead 18' to a conductive ring 24 and to the electrodes 3, the electrodes 3' (and 4–4' through resistors $R_1$ and $R_2$) being connected back to the source 5 through ground G. The outputs of the sensor electrodes 4' and 4 are passed through the sensing resistors $R_1$ and $R_2$, respectively, to cathode followers 26 and 27, respectively, the output of the cathode followers being fed to a pair of brush-slip-ring arrangements and then to a differential amplifier 20. The differential amplifier 20 provides the values of $V_{out}$ shown in the graph of FIG. 4. A balancing capacitance 30' serves to balance the reactive parts of the currents $i_1$ and $i_2$ (the interconnected balancing capacitances shown at 29 and 30 in FIG. 1 perform a like function).

In FIG. 3 the disk 12 may be plexiglass or some other dielectric material rotated by the motor 14 in the direction of the arrow A. Each electrode is one-half wavelength, the electrodes 4 and 4' together making up one half wavelength. The disclosed embodiment contains sixteen electrodes (including the sensing electrodes 4–4' which are essentially at ground potential with relation to the source voltage, but are in fact isolated by a mica insulation, not shown, from a grounded shield 11, as far as $V_{out}$ is concerned); thus a system having eight wavelengths is presented to the material 2. In FIG. 3 the fluid 2 is mechanically separated from the electrodes by an air layer, but plastic or some other insulating material, as shown at 31 in FIG. 2, would serve as well. Furthermore, the bottom 32 of the fluid container illustrated is conductive, as before mentioned, but an insulator bottom, as shown in FIG. 2, will function as well; however, penetration of the electric field below the insulator bottom must be considered.

The induction interaction apparatus herein described provides an attractive technique for measuring the velocity and conductivity of slightly conducting fluids or solids without making electrical or mechanical contact with the material. If the material is highly conducting, in the sense that $R_e \ll G/F$, or if the driving frequency is made large enough ($\omega \gg kU$) the output signal $V_{out}$ is linearly proportional to the fluid velocity. In general, the peak voltage amplitude and resonance frequency are also measures of the material velocity, as has been discussed, while the bandwidth of the resonance is a measure of the conductivity. As the conductivity becomes large, the output signal is diminished unless the driving frequency is also increased. However, as the frequency is increased, the reactive current through the sensing electrodes 4, 4' will also increase. Furthermore, it was assumed that the potential drop across the sensing resistors $R_1$, $R_2$ could be ignored as far as the driving potential is concerned. This assumption becomes invalid at high frequencies because of the large reactive currents that must flow to the sensing segments 4, 4'. Hence, there is an upper limit on the conductivity if the velocity of a material is to be measured. This limit will depend in part on the input impedance of the amplifiers to be used. It appears that the velocity ($\approx 1$ m./sec.) of materials having a conductivity as large as $10^{-3}$ mhos/m. can be measured although accuracy requirements and changes in configuration of the electrodes etc., may increase the allowable conductivity.

At the opposite extreme of conductivity, considerations of a different type limit the usefulness of the velocity sensing. The bandwidth of the output response becomes extremely small. Although this provides for an accurate measure of the velocity, a long period of time is required to establish the resonance condition. The velocity to be measured must be within the bandwidth during this period. Hence, the dynamic response of the sensing mechanism diminishes as the conductivity is decreased; so the number of wavelengths (i.e., electrodes 3, 3') required in a linear system also increases as the conductivity becomes extremely small. It is noted in said article, for example, that a fluid 2 having a conductivity of $3 \times 10^{-9}$ mhos/m. is, for present purposes, a relatively good conductor. Tests on transformer oil having a conductivity of about $2 \times 10^{-12}$ mhos/m. resulted in a sharply peaked curve 21, FIG. 4, thereby providing a very accurate value of U, but changes in the frequency of the power source were found to be quite critical to establish $\nu_{opt}$; furthermore, because of the long relaxation time of transformer oil, a period of about 30 seconds was required to obtain meaningful output values.

The discussion herein has related primarily to the apparatus described as a means of determining velocity of a high-resistance fluid or other material through or past a flowmeter device; or, alternately, motion of the meter relative to the material. The concept herein disclosed, as explained previously, may alo be used to determine conductivity of the fluid 2 by the relationship $$\sigma = 2\pi\epsilon_0 (F/G) \delta f$$

where $\delta f$ is the un-normalized bandwidth in cycles per second taken across the curve 21 between 33 and 33' at a value of ⅞ the peak value of $V_{out}$ shown at 21', the other terms having been defined previously herein. In a conductivity meter an analogue sensing means comprising analogue circuits, shown in block form at 7'', and a calibrated null indicator 9 may be connected between the electrodes 4 and 4' to sense changes in the electrical effect of the charge accumulation by virtue of movement of the material 2 and relate the changes in the electrical effect to the conductivity of the material using the foregoing relationship. The null indicator in this instance may be calibrated in terms of conductivity.

Alternatively, a resonance can be established and the conductivity measured by measuring the rate of decay of $V_{out}$ after the applied alternating signal has been removed, as by a switch 14, using either the elements 7'' and 9 before mentioned or the voltmeter 10 can have analogue circuitry to give a voltage proportional to the time constant of the decay and the voltmeter can be calibrated in terms of conductivity. The conductivity is related to the rate of decay by $$\sigma = (\epsilon_0 / \tau)(G/F)$$

where $\tau$ is the decay time constant.

Since the conductivity meter herein described provides for conductivity determination without mechanical contact between the working electrical elements and the material being tested, the effect of such contact, which is often of an indeterminate value, is obviated.

What is claimed is:

1. Apparatus for determining at least one of velocity and conductivity of a moving material of high electrical resistance that comprises, in combination, means for introducing to the material an electro-quasistatic field having an effective component orthogonal to the direction of movement to induce charge accumulations within the material, sensing means disposed along said direction to sense changes in the electrical effect of said charge accumulations by virtue of said movement.

2. Apparatus as claimed in claim 1 and in which the sensing means comprises a pair of adjacent sensing electrodes spaced apart in said direction, means being provided to determine the time-rate-of-change of the electric charge on the electrodes caused by said movement.

3. Apparatus as claimed in claim 2 and in which the field introducing means comprises a plurality of electrodes adjacently disposed along said direction and adapted to receive an electro-quasistatic potential.

4. Apparatus as claimed in claim 3 and in which each of the sensing electrodes has a length along said direction of one-quarter wavelength of the electro-quasistatic field and the electrodes for introducing the field each has a length of one-half wavelength along said direction and each of said electrodes is mechanically isolated from said material.

5. Apparatus as claimed in claim 3 and having a source of electric potential adapted to introduce different values of electric potential to the field introducing electrodes thereby to create regions alternately of positive and negative electric potential along the said direction, the electric potential at said regions varying in time from positive potential values to negative potential values thereby to create a standing potential wave along said direction.

6. Apparatus as claimed in claim 5 and in which the source of electric potential is an alternating potential source.

7. Apparatus as claimed in claim 6 and in which the magnitude of the electric potential imposed is below a magnitude which would alter the material velocity significantly.

8. Apparatus as claimed in claim 6 and in which the sensing means further comprises a pair of sensing resistors, each connected at one end thereof to one of the said pair of sensing electrodes and at the other end thereof to one side of the potential source.

9. Apparatus as claimed in claim 8 and in which a voltage measuring instrument is connected across said one end of the sensing resistors thereby to sense potential differences effected by induced potential differences between the pair of sensing electrodes caused by the electrical ffect of the charge accumulations by virtue of said movement.

10. Apparatus as claimed in claim 9 and in which the alternating potential source is one of variable frequency, the frequency being varied to maximize said potential difference, the frequency at the point of maximum potential difference being a measure of the velocity of relative movement between the fluid and the sensing electrodes.

11. Apparatus as claimed in claim 1 and in which the sensing means comprises analogue means to sense changes in the electrical effect of the charge accumulations by virtue of the movement, the sensing means being adapted to relate changes in the electrical effect to the conductivity of the material.

12. Apparatus as claimed in claim 11 in which the sensing means includes a pair of adjacent electrodes spaced apart in said direction and the field introducing means comprises a plurality of electrodes adjacently disposed along said direction and each of said electrodes is mechanically isolated from the material.

13. Apparatus as claimed in claim 12 and having a source of alternating potential adapted to introduce different values of electric potential to said pair of adjacent sensing electrodes and said plurality of electrodes thereby to create regions alternately of positive and negative potential along said direction, the electric potential at said regions varying in time from positive potential values to negative potential values thereby to create a standing potential wave along said direction, the magnitude of the electric potential being below a magnitude which would alter the material velocity significantly.

14. Apparatus as claimed in claim 12 and in which the sensing means comprises a voltage measuring means having analogue circuitry connected between the pair of sensing electrodes to sense voltage differences effected by induced potential differences between the sensing electrodes caused by the electrical effect of the charge accumulations by virtue of said movement, means for disconnecting the alternating potential from said electrodes, the analogue circuitry being adapted to provide a voltage proportional to the time constant of the decay of the voltage difference and calibrated in terms of conductivity by the relationship $$\sigma = (\epsilon_0/\tau)(G/F)$$

15. A method of determining relative movement between a high resistance material and an electro-quasistatic field that comprises, introducing to the material an electro-quasistatic field having effective transverse and longitudinal components to induce charge accumulations within the material, effecting relative movement between said field and the material having a component in a direction orthogonal to the transverse component, changing the magnitude of the field in time, establishing an angular frequency of the time-changing field at a value substantially equal to the inverse of the time required for the material to traverse one wavelength, and sensing the translational motion of the charge accumulations by virtue of said relative movement.

16. A method of determining relative movement of a high resistance material that comprises, introducing to the material an electro-quasistatic field having effective transverse and longitudinal components to induce charge accumulations within the material, effecting relative movement between the field and the material in a direction having a component orthogonal to the transverse component, changing the magnitude of the field periodically in time, and sensing the motion of the charge accumulations by virtue of said relative movement.

17. A method as claimed in claim 16 and in which resonance is determined by sensing the angular frequency at which maximum energy transfer exists between the field and the material.

18. A method as claimed in claim 16 and in which the electro-quasistatic field comprises a standing wave.

19. A method as claimed in claim 16 and in which the angular frequency of the time-changing field is established at a value substantially equal to the inverse of the time required for the relative movement between the field and the material to equal one wavelength.

20. A method as claimed in claim 19 and in which the motion of the charge accumulations effects a differential voltage between two electrodes disposed along said direction and mechanically isolated from said material, said differential voltage being optimal when the angular frequency is equal to the inverse of the time required for the relative movement between the field and the material to equal one wavelength.

21. A method as claimed in claim 20 and in which the differential voltage is determined and the frequency is increased and decreased to establish frequency values at which said differential voltage is at a value ⅞ the value of the optimal voltage and the conductivity ($\sigma$) of said material is determined by the relationship $$\sigma = 2\pi\epsilon_0(F/G)\delta f$$

22. A method as claimed in claim 20 and in which the electro-quasistatic field is removed from the material and the conductivity ($\sigma$) of said material is determined by the relationship $$\sigma = (\epsilon_0/\tau)(G/F)$$

23. A method as claimed in claim 16 and in which the angular frequency of the time-changing field is varied in time to establish a frequency at which a resonant condition exists between the field and the induced charges, resonance occurring when the angular frequency of the field is at a value substantially equal to the inverse of the time required for the material to traverse one wavelength.

References Cited

UNITED STATES PATENTS

| | | | |
|---|---|---|---|
| 2,184,511 | 12/1939 | Bagno et al. | |
| 2,861,452 | 11/1958 | Morgan | 73—194 |
| 3,191,436 | 6/1965 | Davis | 73—194 |
| 3,286,522 | 11/1966 | Cushing | 73—194 |
| 3,340,400 | 9/1967 | Quittner. | |

FOREIGN PATENTS

| | | |
|---|---|---|
| 964,390 | 7/1964 | Great Britain. |

CHARLES A. RUEHL, Primary Examiner

U.S. Cl. X.R.

324—30, 61